(12) United States Patent
Chun et al.

(10) Patent No.: US 8,180,299 B2
(45) Date of Patent: May 15, 2012

(54) OPTIMIZED AM RLC RE-SET MECHANISM

(75) Inventors: Sung-Duck Chun, Gyeonggi-Do (KR);
Young-Dae Lee, Gyeonggi-Do (KR);
Myung-Cheul Jung, Seoul (KR);
Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 12/307,171

(22) PCT Filed: Oct. 25, 2006

(86) PCT No.: PCT/KR2006/004379
§ 371 (c)(1),
(2), (4) Date: Dec. 31, 2008

(87) PCT Pub. No.: WO2008/004725
PCT Pub. Date: Jan. 10, 2008

(65) Prior Publication Data
US 2009/0264127 A1   Oct. 22, 2009

(30) Foreign Application Priority Data
Jul. 5, 2006   (KR) .......................... 10-2006-0063136

(51) Int. Cl.
*H04W 60/00* (2009.01)
(52) U.S. Cl. .................................. 455/67.11; 455/435.2

(58) Field of Classification Search ................ 455/67.11, 455/435.1, 435.2, 445, 517
See application file for complete search history.

(56) References Cited

U.S. PATENT DOCUMENTS

| | | | |
|---|---|---|---|
| 6,987,981 B2 * | 1/2006 | Kuo | ............................. 455/502 |
| 2001/0029188 A1 * | 10/2001 | Sarkkinen et al. | ............ 455/517 |
| 2003/0092458 A1 | 5/2003 | Kuo | |
| 2003/0206534 A1 | 11/2003 | Wu | |
| 2003/0235162 A1 * | 12/2003 | Chao et al. | ..................... 370/329 |
| 2004/0076182 A1 | 4/2004 | Wu | |
| 2006/0223537 A1 | 10/2006 | Kojima | |
| 2006/0281413 A1 * | 12/2006 | Burbidge et al. | .......... 455/67.11 |

\* cited by examiner

*Primary Examiner* — Dwayne Bost
*Assistant Examiner* — Myron Wyche
(74) *Attorney, Agent, or Firm* — Birch, Stewart, Kolasch & Birch, LLP

(57) ABSTRACT

A reset method for an AM RLC entity, the method comprising: receiving a reset PDU that includes a RSN; and if the received reset PDU is not the first received reset PDU after re-establishment of the RLC entity and if the RSN is the same as a RSN included in a last received reset PDU, re-transmitting the reset ACK PDU that was last transmitted. The method further comprising: if the received reset PDU is the first received reset PDU after re-establishment of the RLC entity or if the RSN is not the same as a RSN included in a last received reset PDU, transmitting a reset ACK PDU.

8 Claims, 3 Drawing Sheets

[Fig. 1]
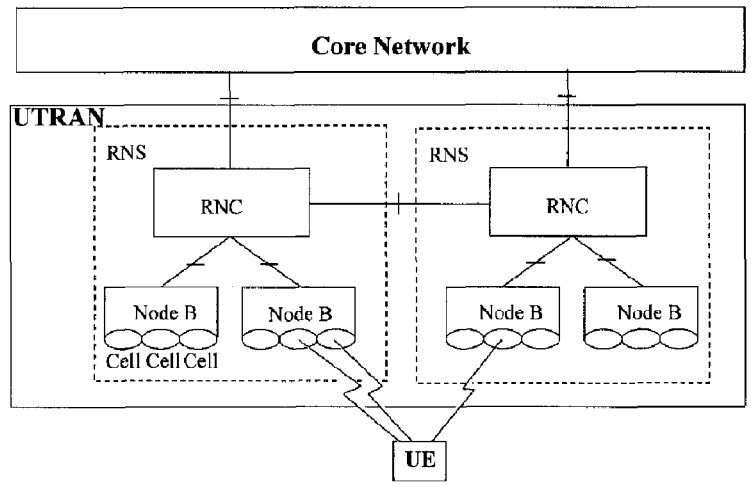
[Fig. 2]
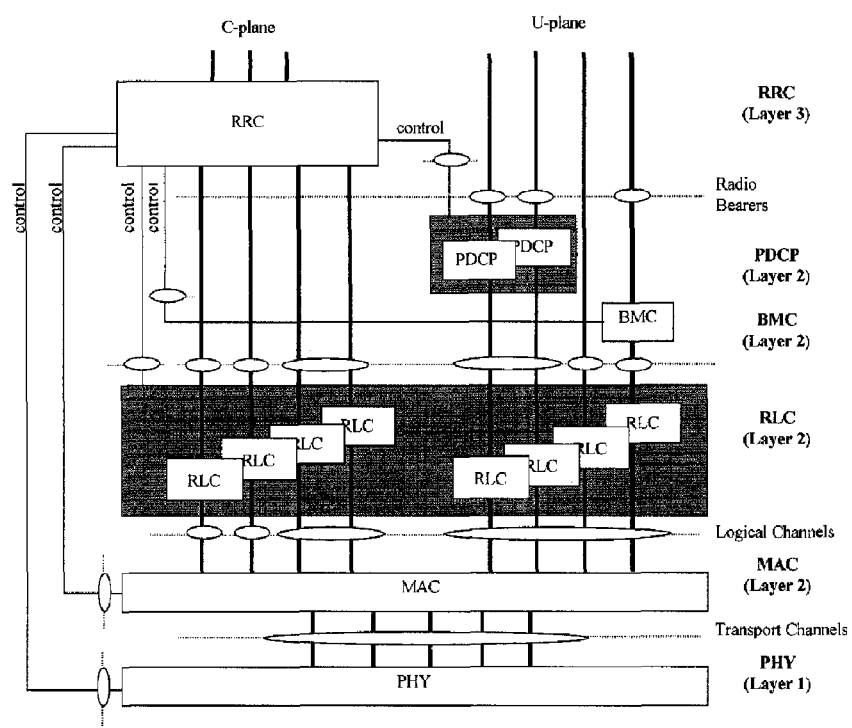
[Fig. 3]

[Fig. 4]

| D/C | PDU type | SUFI$_1$ | Oct 1 |
| --- | --- | --- | --- |
| | SUFI$_1$ | | Oct2 |
| | ... | | |
| | SUFI$_K$ | | |
| | PAD | | OctN |

[Fig. 5]

| R2 | PDU Type | SUFI$_1$ | Oct1 |
| --- | --- | --- | --- |
| | SUFI$_1$ | | Oct2 |
| | ... | | |
| | SUFI$_K$ | | |
| | PAD | | OctN |

[Fig. 6]

| D/C | PDU Type | RSN | R1 | Oct1 |
| --- | --- | --- | --- | --- |
| | HFNI | | | |
| | HFNI | | | |
| HFNI | | | | |
| | PAD | | | OctN |

OPTIMIZED AM RLC RE-SET MECHANISM

TECHNICAL FIELD

The present invention relates to an operation method of an AM RLC in a UMTS (Universal Mobile Telecommunications System), which is a European type IMT-2000 system. In particular, the present invention relates to an improved AM RLC re-establishment method, whereby when the RLC entity is re-established, the AM RLC reduces the (number of amount of) data or control messages to be deleted, to thus minimize discontinuous communications and can increase data transmission and reception rates.

BACKGROUND ART

FIG. 1 shows an exemplary network architecture for UMTS (Universal Mobile Telecommunications System). The UMTS system is generally comprised of mobile terminals (user equipment: UE), a UTRAN (UMTS Terrestrial Radio Access Network), and a core network (CN). The UTRAN has one or more radio network sub-systems (RNS), with each RNS having a radio network controller (RNC) and one or more base stations (Node Bs). For each Node B, one or more cells exist.

FIG. 2 shows an exemplary radio protocol architecture used in UMTS. These radio protocol layers exist in the UE and UTRAN in pairs, and handles data transmissions over the radio interface. With respect to each radio protocol layer, the PHY layer (Layer 1) serves the purpose of transmitting data over the radio interface by using various radio transmission techniques. The PHY layer is connected with a MAC layer (a higher level layer) via transport channels in order to support reliable data transmissions, and the transport channel can be divided into dedicated transport channels and common transport channels according to whether or not the channels are shared.

In Layer 2, the MAC, RLC, PDCP and BMC layers exist. The MAC layer performs mapping of various logical channels to various transport channels, and also performs logical channel multiplexing for mapping multiple logical channels to a single transport channel. The MAC layer is connected with the RLC layer (a higher level layer) via logical channels, and the logical channels are divided into control channels for transmitting control plane information and traffic channels for transmitting user plane information, according to the type of data being transmitted. The MAC layer can be further divided into a MAC-b sub-layer, a MAC-d sub-layer, a MACc/sh sub-layer, a MAC-hs sub-layer, and a MAC-e sub-layer according to the types of transport channels being managed. The MAC-b sub-layer handles the management of a BCH (Broadcast Channel), which is a transport channel for handling the broadcast of system information. The MAC-c/sh sub-layer manages common transport channels such as a FACH (Forward Access Channel), a DSCH (Downlink Shared Channel), and the like that are shared by various mobile terminals. The MAC-d sub-layer handles the management of a DCH (Dedicated Channel) that is a dedicated transport channel for a particular mobile terminal. The MAC-hs sub-layer manages a HS-DSCH (High Speed Downlink Shared Channel), which is a transport channel for high speed downlink data transmission. The MAC-e sub-layer manages a E-DCH (Enhanced Dedicated Channel), which is a transport channel for high speed uplink data transmission.

The RLC layer guarantees the quality of service (QoS) of each radio bearer (RB) and handles the transmission of data thereof. To guarantee the QoS that is unique to an RB, the RLC layer has one or two independent RLC entities for each RB, and provides three types of RLC modes, namely, TM (Transparent Mode), UM (Unacknowledged Mode), and AM (Acknowledged Mode) in order to support various QoS. Also, the RLC layer performs the function of adjusting the size of data to be appropriate for a lower level layer to transmit data over the radio interface. To do so, a function of segmentation and concatenation of data received from a higher level layer is performed.

The PDCP layer is located at a higher level from the RLC layer, and employs IP (Internet Protocol) packet formats (such as IPv4 or IPv6) to allow efficient data transmission over the radio interface having a relatively small bandwidth. To do so, the PDCP layer performs the function of header compression, which allows transmission of only necessary information in the header portion of the data, to thus increase the transmission efficiency of the radio interface. As header compression is the basic function, the PDCP layer only exists in the PS domain, and in order to provide effective header compression with respect to each PS service, one PDCP entity exists for each RB.

Additionally, in Layer 2, a BMC (Broadcast/Multicast Control) layer exists at a higher level from the RLC layer, and performs scheduling of cell broadcast messages and performs the function of broadcasting to mobile terminals located in a particular cell. The RRC (Radio Resource Control) layer located at the lowermost portion of Layer 3, is only defined in the control plane, controls the parameters of Layer 1 and Layer 2 that are related to the setup, reconfiguration, and release of RBs, and also handles the control of logical channels, transport channels, and physical channels. Here, the RB refers to a logical path that is provided by Layer 1 and Layer 2 of the radio protocol for data transfer between the mobile terminal and the UTRAN. In general, the setup of an RB refers to the process of stipulating the characteristics of a protocol layer and a channel required for providing a specific service, and setting the respective detailed parameters and operation methods.

The RLC layer that is related to the present invention will be considered in more detail.

A basic function of the RLC layer is to guarantee the QoS of each RB and to transmit data thereof. As the RB service is a service that the Layer 2 of the radio protocol provides to a higher level, the entire Layer 2 effects the QoS, and in particular, the effect of the RLC layer is significant. To guarantee the QoS that is unique to the RB, the RLC layer has independent RLC entities for each RB, and provides three types of RLC modes (TM, UM, AM) for supporting various QoS. These three modes of the RLC layer have differences in their operation methods because the QoS that they respectively support are different, and their detailed functions also have differences. As such, the RLC layer should be considered in more detail with respect to their operation modes.

The TM RLC is a mode in which no overhead is attached to the RLC SDU received from a higher level when forming (constituting) a RLC PDU. Namely, the name TM RLC refers to the fact that the RLC passes the SDUs in a transparent manner, and the following functions are performed in the user plane and the control plane. In the user plane, because the data processing time is short, transmission of real-time circuit data, such as voice or streaming of the circuit service (CS) domain, are handled. In the control plane, because there is no overhead within the RLC, in case of the uplink, transmission of RRC messages from unspecified mobile terminals are handled, while for the downlink, transmission of RRC messages that are broadcast to all mobile terminals within a cell are handled.

Unlike the transparent mode (TM), the mode in which overhead is added by the RLC is called a non-transparent mode, which comprises two types of modes; unacknowledged mode (UM) that provides no response that acknowledges receipt of transmitted data (UM), and acknowledged mode (AM) that provides a response. The UM RLC transmits each PDU upon adding thereto a PDU header that includes a sequence number (SN), to thus allow the receiving side to know which PDUs were lost (or missing) during transmission. Due to such function, the UM RLC handles the transmission of broadcast/multicast data in the user plane or the transmission of real-time packet data, such as voice (e.g., VoIP) or streaming of the packet service (PS) domain, and in the control plane, the transmission of RRC messages that do not need a reception acknowledgement response among the RRC messages transmitted to a particular terminal or particular terminal group.

As a type of non-transparent mode, the AM RLC forms a PDU by adding a PDU header that includes a SN (as done in the UM RLC), but unlike the UM RLC and the significant difference therefrom is that the receiving side provides an acknowledgement for a PDU transmitted from the transmitting side. In AM RLC, the reason why the receiving side provides acknowledgement is to request the transmitting side to re-transmit those PDUs that could not be received. Such re-transmission function is one of the most significant characteristics of the AM RLC. As a result, the purpose of the AM RLC is to guarantee error-free data transmissions through the re-transmitting function. Due to this purpose, the AM RLC, in the user plane, usually handles non-real-time packet data transmissions (such as TCP/IP of the PS domain), and in the control plane, handles the transmission of RRC messages that always requires reception acknowledgement response among the RRC messages transmitted to a particular terminal within a cell.

With respect to directions, the TM RLC and UM RLC are used in uni-directional communications, while AM RLC is used in bi-directional communications because there is feedback from the receiving side. As bi-directional communications are generally used for point-to-point communications, the AM RLC uses only a dedicated logical channel. There are also differences in structure, whereby for TM RLC and UM RLC, a single RLC entity has one type of structure for either a transmitter or receiver, but for AM RLC, a single RLC entity has both a transmitter and a receiver.

The AM RLC is complicated because of its re-transmission function. For managing re-transmission functions, the AM RLC has a re-transmission buffer in addition to a transmission/reception buffer, employs a transmission/reception window for flow control, performs a polling function whereby the transmitter requests status information from the peer RLC of the receiver, employs a status report sent by a receiver to report its buffer state to a peer RLC of the transmitter, employs a status PDU to carry the status information, performs a piggyback function that inserts a status PDU into a data PDU in order to increase data transmission efficiency, and also performs many other functions. In addition, if the AM RLC entity discovers a significant error during its operation process, a Reset PDU is employed to request the peer AM RLC entity to re-set all operations and parameters, and a Reset Ack PDU is used for responding to such Reset PDU. Also, to support such functions, the AM RLC requires various protocol parameters, state variables, timer, and the like. The PDUs used for data transmission control in the AM RLC, such as a status report or status PDU, Reset PDU, etc. are called Control PDUs, while the PDUs used for transferring user data are called Data PDUs.

To summarize, the PDUs used in AM RLC are divided into two types; Data PDUs and Control PDUs. There are four types of Control PDUs, namely, a Status PDU, a Piggybacked Status PDU, a Reset PDU, and a Reset Ack PDU.

A Reset Procedure is one situation where a Control PDU is employed. The Reset Procedure is used to solve problems when there is an erroneous situation in the operation of the AM RLC, such as when the sequence numbers being respectively used are different, when a certain number of transmission failures for a PDU or SDU occur, and the like. Upon using the Reset Procedure, the AM RLC of the receiver and of the transmitter initialize the state variables such that a state where communication can be performed again is achieved. The Reset Procedure is as follows. First, the side that determined to start the Reset Procedure, namely the AM RLC of the transmitter includes the transmission direction HFN (Hyper Frame Number) that it currently uses into the Reset PDU and transmits such to the receiver. Then, upon receiving such Reset PDU, the AM RLC of the receiver resets its reception direction HFN value and also initializes the sequence numbers and other various state variables. Also, the receiver AM RLC transmits a Reset Ack PDU that includes its reception direction HFN value to the transmitter AM RLC, and upon receiving this Reset Ack PDU, the transmitter AM RLC initializes various state variables after resetting its reception direction HFN value.

FIG. 3 shows an exemplary structure of an RLC PDU used in an AM RLC entity. Here, the structure of an AMD PDU, which is a Data PDU used when transmitting data.

The AMD PDU is used when the AM RLC entity is to transmit user data or to transmit piggybacked status information and a polling bit. The user data portion comprises 8 bit integer multiples, and the AMD PDU header comprises a sequence number having a size of 2 octets. Also, the header portion of the AMD PDU includes a length indicator.

FIG. 4 shows an exemplary structure of a Status PDU. The Status PDU is comprised of different types of super fields (SUFI). The Status PDU may have a variable size, but is limited to the size of the largest RLC PDU of the logical channel on which the Status PDU is transmitted. Here, the SUFI serves the purpose of providing certain information, such as indicating which AMD PDUs arrived at the receiver or which AMD PDUs have not arrived. The SUFI may be comprised of three parts; type, length and value.

FIG. 5 shows an exemplary structure of a Piggybacked Status PDU. The structure of the Piggybacked Status PDU is similar to that of the AMD PDU, but the D/C field of the AMD PDU is replaced with a reserved but (R2). The Piggybacked Status PDU is inserted if there is sufficient space remaining in the AMD PDU. The PDU type value is always fixed to be 000. Ultimately, a Control PDU includes both a Status PDU and a Piggybacked Status PDU.

FIG. 6 shows an exemplary structure of a Reset/Reset Ack PDU. The Reset PDU includes a 1 bit sequence number called an RSN. The Reset Ack PDU is transmitted in response to the received Reset PDU, and the RSN of the received Reset PDU is included when transmitting.

The following parameters are used in the Reset/Reset Ack PDU format.

(1) D/C field: indicates whether the PDU is a Control PDU or Data PDU (2) PDU Type: indicates the type of Control PDU, namely, whether the PDU is a Reset PDU, Status PDU, etc.

(3) Sequence Number: refers to sequence number information of the AMD PDU.

(4) Polling Bit: set when requesting a Status Report from the receiver.

(5) Extension bit (E): indicates whether or not the next octet is a length indicator.

(6) Reserved bit (R1): if used in a Reset PDU or a Reset Ack PDU, coded as 000.

(7) Header extension (HE): indicates whether the next octet is a length indicator or data.

(8) Length indicator: indicates the location of a boundary, if such boundary exists between respectively different SDUs within the data portion of a PDU.

(9) PAD: indicates a padding region, but not used in the AMD PDU.

The Reset procedure for the AM RLC entity will be explained below.

First, when a situation where a Reset procedure needs to be performed occurs, the receiver must send a Reset PDU to the transmitter. The Reset procedures is performed if a Status PDU containing an erroneous sequence number is received or if a particular PDU transmission has failed a certain number of times. When a Reset PDU is transmitted, the transmitter performs the following operations.

1. Transmission of the AMD PDU and Status PDU is stopped.
2. The received AMD RLC PDU, the Status PDU, and the Piggybacked Status PDU are ignored.
3. The VR(RST) is incremented by 1.
4. If VR(RST) is greater than MaxRST, this is informed to the RRC, if VR(RST) is less than MaxRST, the Reset PDU is transmitted to the receiver.

Here, the VR(RST) is initialized by using internal parameters of the receiver each time the reset procedure is performed. This value is the maximum value of transmitting the Reset PDU for each reset procedure. Namely, if the Reset PDU transmission exceeds the MaxRST value, the reset procedure is immediately terminated and the higher level is informed that an unsolvable error has occurred.

When the transmitter transmits the Reset PDU, a HFNI value and a RSN value are included in the transmission. Here, the transmitter sets the HFNI as the maximum HFN value that it uses. The HFN is a values used in encoding (encryption) and the transmitter uses the HFN value to encode the portions of the AMD PDU excluding the SN value of thereof. The receiver uses the same HFN value to decode the received AMD PDU. If the receiver and the transmitter do not have the same HFN value, communication therebetween cannot be maintained. Accordingly, in the reset procedure, the transmitter and receiver exchange their HFN values such that both the transmitter and receiver are set to have the same HFN value. Thus, the transmitter and the receiver include their HFN value in the Reset PDU or the Reset Ack PDU when transmitting.

The RSN value is used for matching each of the Reset PDUs and the Reset Ack PDUs. Namely, if the transmitter sent a Reset PDU with the RSN value set to 1, the receiver recognizes only the Reset Ack PDU having the RSN set to 1 as its desired Reset Ack PDU. If a Reset Ack PDU with a RSN value set to a value other than 1 is received, such Reset Ack PDU is deems as erroneous and is thus discarded. Also, for each reset procedure that begins, the RSN value is increased by one.

When the Reset Ack PDU is transmitted in response to the Reset PDU, the receiver sends the largest value HFN that is used in its transmission direction by filling it into the HFNI, and also, the same RSN value as that included in the corresponding Reset PDU is included in the Reset Ack PDU and transmitted.

Upon receiving the Reset PDU, the receiver performs the following operations.

1. The transmitter compares whether the RSN value used in the reset procedure that was last performed with the RSN value included in the currently received Reset PDU are the same or not. Then, step 2 is performed.
2. If the RSN values are the same in step 1, the receiver again transmits a Reset Ack PDU using the same value as that for previously transmitting the Reset Ack PDU. Then, step 3 is performed.
3. If the currently received Reset PDU is the first Reset PDU received after the RLC entity was established or re-established, or if the RSN values is different than that of the most recently received Reset PDU, then the following steps are sequentially performed; otherwise the process is terminated.
4. A Reset Ack PDU is newly formed and transmitted.
5. The state variables are initialized and the currently operating Timer is stopped.
6. The received RLC PDUs are discarded.
7. The RLC PDUs transmitted before the Reset are discarded.
8. The HFN of the receiver direction is set according to that in the received Reset PDU.
9. The HFN of the transmitter direction and of the receiver direction are increased by 1.

After the transmitter transmits the Reset PDU, a Reset Ack PDU is waited to be received, and when the Reset Ack PDU is received, the following operations are performed by the transmitter.

1. If the RSN value included in the Reset Ack PDU is the same as the RSN value included in the Reset PDU that it transmitted, the following steps are performed; otherwise, the Reset Ack PDU is discarded.
2. The HFN of the receiver direction is reset by using the HFNI value included in the received Reset Ack PDU.
3. The state variables are initialized and the currently operating Timer is stopped.
4. The received RLC PDUs are discarded.
5. The RLC PDUs transmitted before the Reset are discarded.
6. The HFN of the transmitter direction and of the receiver direction are increased by 1.

After performing such reset procedure, the transmitter and receiver both have the same HFN, and the encoding and decoding procedures are performed with this HFN.

DISCLOSURE OF INVENTION

Technical Problem

However, the related art procedure may result in unnecessary repetitive reset operations.

Technical Solution

The present invention has been developed in order to solve the above described problems of the related art such that unnecessary repetitive reset operations are minimized. As a result, the present invention provides an optimized AM RLC re-set mechanism, which ensures that a reset acknowledgement is not repetitively transmitted.

BRIEF DESCRIPTION OF THE DRAWINGS

FIG. 1 shows an exemplary UMTS network architecture applicable to the related art and the present invention.

FIG. 2 shows an exemplary radio protocol architecture used in UMTS.

FIG. 3 shows an exemplary structure of an AM RLC PDU that is a data PDU used when data is transmitted.

FIG. 4 shows an exemplary structure of a Status PDU.

FIG. 5 shows an exemplary structure of a Piggyback Status PDU.

FIG. 6 shows an exemplary structure of a Reset/Reset Ack PDU.

MODE FOR THE INVENTION

Figure 7:
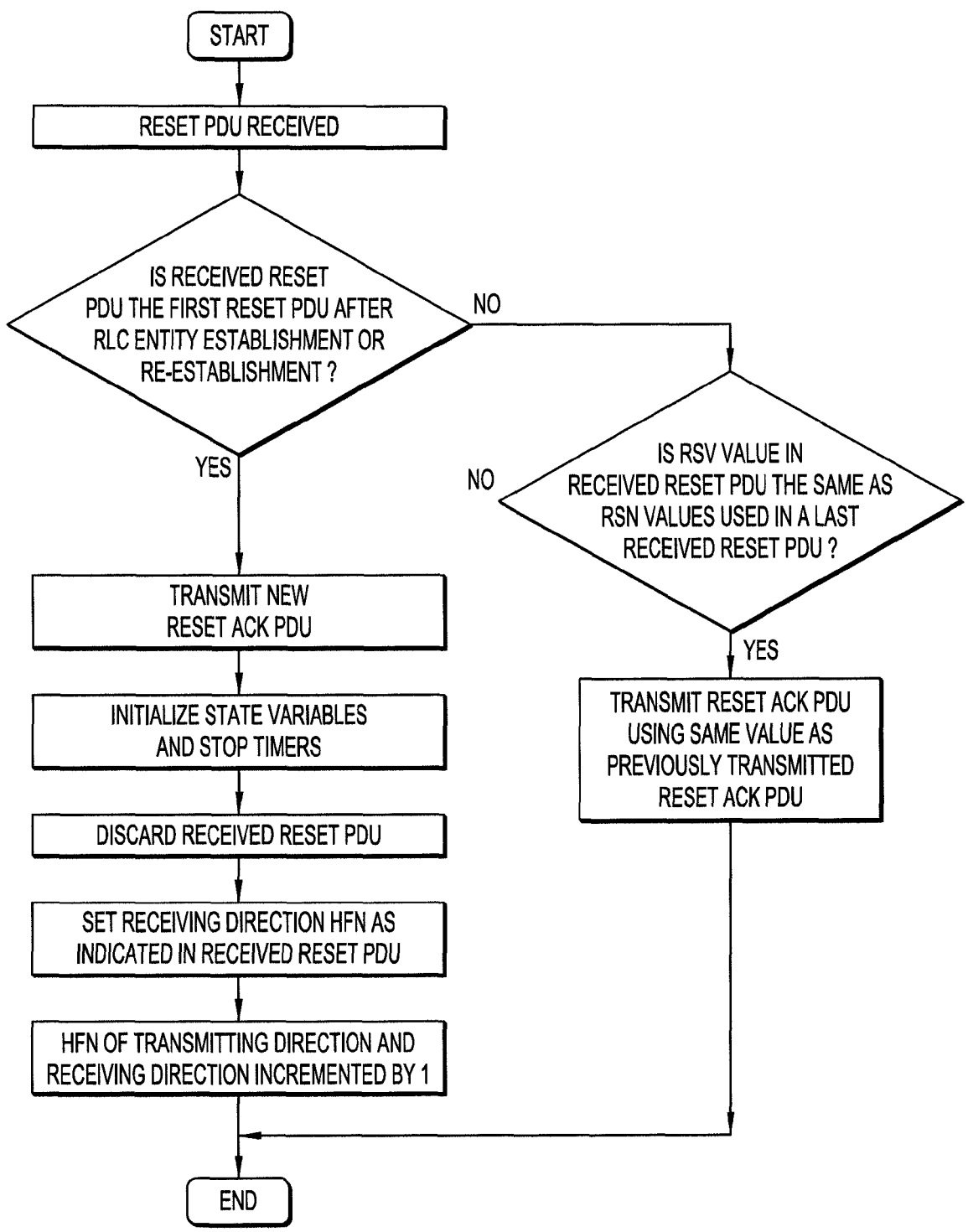
FIG. 7 shows an AM RLC reset method according to an embodiment of the present invention.

One aspect of the present invention is the recognition by the present inventors regarding the problems and drawbacks of the related art described above and explained in more detail hereafter. Based upon such recognition, the features of the present invention have been developed.

The concepts and features of the present invention may be generally described as follows:

First, it should be noted that there may be many reasons why RLC reset must be performed. One example would be when there are problems or errors in ciphering. Namely, ciphering (encoding) and deciphering (decoding) cannot be properly performed if the HFN values among peer RLCs (i.e., transmitter RLC and receiver RLC) are different.

Another example where reset is necessary would be when a certain PDU could not be received despite many attempts. This may be due to the fact that a Reset PDU, a Reset Acknowledgement PDU, or both may not have been properly received.

In the related art, when AM RLC reset is performed, a reset request is received and the RSN values are compared to see if they are the same. If so, a reset acknowledgement is sent and the reset procedure can be terminated. If not, it is determined whether the reset request is the first reset request after the AM RLC has been set or reset. If so, the reset request is sent again.

However, because the related art procedure may lead to unnecessary repetitive reset operations, the optimized AM RLC reset scheme (procedure or mechanism) of the present invention ensures that a reset acknowledgement is not repetitively transmitted.

The above general concepts and features will be described in more detail with respect to various embodiments of the present invention.

In the related art, upon receiving a Reset PDU transmitted from a transmitter, the receiver compares whether the RSN value included in the received Reset PDU is the same as the RSN value used in the most recently performed reset procedure. If they are the same, then the same Reset Ack PDU that was previously sent is transmitted. After that, the receiver determines whether the received Reset PDU is the first Reset PDU after the RLC entity has been set or reset, and if so, a Reset Ack PDU is transmitted.

In the related art, even if the receiver operates in such a sequential manner, there are no situations where the receiver sends a Reset Ack PDU more than once. However, as HSDPA (High Speed Downlink Packet Access) and HSUPA (High Speed Uplink Packet Access) techniques are being introduced, there are many instances where resetting of the RLC occurs. An example would be when a mobile terminal, located (camped) within one cell, is initially located at a center of the cell but moves to the boundary (or edge) of the cell.

Namely, when the mobile terminal is at a central region of the cell, AM RLC PDU(s) having a relatively large size may be used, but when located at a cell boundary, the quality of the radio environment is degraded, and thus, relatively large sized AM RLC PDU(s) cannot be used. Accordingly, when the mobile terminal moves from a center of the cell to a cell boundary, or vice versa, despite the fact that the mobile terminal remains within the same cell, there is a need to change the size of the AM RLC PDU(s) used by the mobile terminal. The introduction of HSDPA and HSUPA has allowed various types of physical channels and transport channels to be used, and AM RLC PDU(s) having an optimal size for each physical channel or each transport channel can be used. As the size of the AM RLC PDU(s) changes, the RLC entity must be re-established.

Here, the RSN value used in the reset procedure is 1 bit, which changes in a manner such as 0, 1, 0, 1, etc. Here, the first 1 and the fourth 1 refer to a reset procedure, but because the RSN value itself is only 1 bit, this distinction cannot be made. The following example will be provided:

1. AM RLC entity is set.
2. The first reset procedure begins. Here, the transmitter uses RSN=0.
3. The receiver transmits a Reset Ack PDU, and the receiver transmits a Reset Ack PDU that has RSN=0.
4. The transmitter receives the Reset Ack PDU that has RSN=0 and terminates the first reset procedure.
5. The transmitter and receiver continuously exchange data.
6. Due to a location change of the mobile terminal, the AM RLC is reset, and the RSN value is initialized to 0.
7. The second reset procedure begins, and the transmitter transmits a Reset PDU having RSN=0.
8. The receiver receives the Reset PDU having RSN=0.

Here, in step 8, the receiver sends two Reset Ack PDUs to the transmitter. Namely, in the procedure above, the Reset PDU received in the second reset procedure has a RSN of 0, but this uses the same RSN value as that of the most recently performed reset procedure (i.e., the first reset procedure), and thus the receiver sends a Reset Ack PDU that is the same as the Reset Ack PDU that was previously transmitted. However, because the Reset PDU received by the receiver is the first Reset PDU received after the RLC entity is reset, the receiver forms a new Reset Ack PDU and sends it to the transmitter.

Such procedure results in a communication failure. When data is exchanged as in step 5, the HFN value increases steadily. Namely, the HFN value used in the first reset procedure and the HFN value used in the second reset procedure can only be different. Thus, the respective HFNI values included in the two Reset Ack PDUs to be transmitted by the receiver can only be different. This results in the transmitter having to randomly choose one of the two HFNI values, or makes the transmitter not operate properly. If the HFNI value selected by the transmitter is not the same HFN values used by the receiver, the transmitter cannot properly decode the data transmitted from the receiver, and results in problems of communication failure.

Thus, the present invention makes the receiver of the AM RLC entity transmit a single Reset Ack PDU to resolve the problems due to overlapping transmission and uncertainty of encoding parameters, to thus minimize communication failures while state variables are set again, by providing an optimal reset procedure.

To achieve this, the present invention proposes that the receiver, which received the Reset PDU, should initially determine whether the corresponding Reset PDU is the first Reset PDU received after the corresponding RLC entity was established or re-established. In the related art, problems occurred because the receiver does not check whether or not the RLC entity was established or re-established, but first checks whether the RSN values are the same or not. Accordingly, in the present invention, before determining whether the RSN values are the same, the establishment or re-establishment of the RLC entity is first determined. If the corresponding Reset PDU is not the first received Reset PDU after establishment or re-establishment of the RLC entity, it is determined whether or not the RSN value included in the corresponding Reset PDU is the same as the RSN value used in the previously performed reset procedure.

FIG. 7 is an exemplary embodiment of the receiver according to the present invention, for the receiver procedures after a Reset PDU is received:

1. If the currently received Reset PDU is the first Reset PDU received after establishment or re-establishment of the current RLC entity or if the RSN value of the currently received Reset PDU and that of the most recently received Reset PDU are different, steps 2 through 7 are performed and then terminated. Else if the RSN value used in the last performed reset procedure and the RSN value included in the currently received Reset PDU are the same, step 8 is performed.

2. A Reset Ack PDU is newly formed and transmitted.

3. State variables are initialized and currently operating Timers are stopped.

4. The received RLC PDUs are discarded.

5. The RLC SDUs transmitted before Reset are discarded.

6. The HFN of the receiving direction is set according to that included in the received Reset PDU.

7. The HFN of the transmitting direction and that of the receiving direction are incremented by 1.

8. If the RSN values are respectively same in step 1, the receiver transmits a Reset Ack PDU again with the same value as the Reset Ack PDU transmitted previously.

According to the above, in any case, the mobile terminal does not transmit more than a single Reset Ack PDU, thus the transmitter receives a single Reset Ack PDU, which prevents the transmitter and receiver from having a different HFN.

The above procedure is divided into two flows according to the condition of step 1. Namely, the receiver according to the present invention cannot transmit more than one Reset Ack PDU in any situation.

Thus, the present invention proposes that the receiver transmit only a single Reset Ack PDU in any situation. To do so, it is proposed that the receiver determines which of the following two conditions is satisfied and only one operation is performed accordingly. The first condition is whether the currently received Reset PDU is the first Reset PDU received after establishment or re-establishment of the current RLC entity or whether the RSN value of the currently received Reset PDU and that of the most recently received Reset PDU are different. The second condition is whether the currently received Reset PDU is not the first Reset PDU received after establishment or re-establishment of the current RLC entity and also whether the RSN value of the currently received Reset PDU and that of the most recently received Reset PDU are the same. Among these two conditions, the receiver selects only one condition that is satisfied by the received Reset PDU, and operates according to that condition.

In the above procedure, if the first condition is satisfied, the receiver operates as follows:

1. A Reset Ack PDU is newly formed and transmitted.

2. State variables are initialized and currently operating Timers are stopped.

3. The received RLC PDUs are discarded.

4. The RLC SDUs transmitted before Reset are discarded.

5. The HFN of the receiving direction is set according to that included in the received Reset PDU.

6. The HFN of the transmitting direction and that of the receiving direction are incremented by 1.

In the above procedure, if the second condition is satisfied, the receiver operates as follows:

1. The receiver transmits a Reset Ack PDU again using the same value as the Reset Ack PDU transmitted previously.

Accordingly, an example of another operation of the present invention is as follows:

1. Determine if the currently received Reset PDU is not the first Reset PDU received after establishment or re-establishment of the current RLC entity and also determine if the RSN value of the currently received Reset PDU and that of the most recently received Reset PDU are the same. If these two conditions are satisfied, the receiver performs step 2 only; otherwise, steps 3 through 8 are performed.

2. The receiver transmits the Reset Ack PDU again using the same value as the Reset Ack PDU that was previously transmitted.

3. A Reset Ack PDU is newly formed and transmitted.

4. State variables are initialized and currently operating Timers are stopped.

5. The received RLC PDUs are discarded.

6. The RLC SDUs transmitted before Reset are discarded.

7. The HFN of the receiving direction is set according to that included in the received Reset PDU.

8. The HFN of the transmitting direction and that of the receiving direction are incremented by 1.

The above procedures may also be implemented in the following manner:

Regarding the results of the present invention, the unnecessary transmission of more than one RLC ACK PDU, by the receiver Am RLC entity that received the Reset PDU, is prevented. This solves the problem of communication failures due to more than one RESET ACK PDUs being sent to the transmitter, which caused different RLC state variables being set in the transmitter and receiver, respectively. Accordingly, the transmission capability of the RLC entity is improved.

The present disclosure provides a reset method for a receiving side Acknowledged Mode Radio Link Control entity, the method comprising: receiving, from a transmitting side, a reset Protocol Data Unit that includes a Reset Sequence Number; and if the received reset Protocol Data Unit is not the first received reset Protocol Data Unit after re-establishment of the Radio Link Control entity and if the Reset Sequence Number is the same as a Reset Sequence Number included in a last received reset Protocol Data Unit, re-transmitting a reset Acknowledgement Protocol Data Unit that was last transmitted to the transmitting side. The method may further comprise: if the received reset Protocol Data Unit is the first received reset Protocol Data Unit after re-establishment of the Radio Link Control entity or if the Reset Sequence Number is not the same as a Reset Sequence Number included in a last received reset Protocol Data Unit, transmitting a reset Acknowledgement Protocol Data Unit to the transmitting side.

Also, the present disclosure provides a reset method for a transmitting side Acknowledged Mode Radio Link Control entity, the method comprising: transmitting, to a receiving side, a reset Protocol Data Unit that includes a Reset Sequence Number; and receiving, from the receiving side, a re-transmission of a reset Acknowledgement Protocol Data Unit that was last transmitted, if the receiving side determined that the received reset Protocol Data Unit is not the first received reset Protocol Data Unit after re-establishment of the Radio Link Control entity and determined that the Reset Sequence Number is the same as a Reset Sequence Number included in a last received reset Protocol Data Unit. The method may further comprise: receiving, from the receiving side, a reset Acknowledgement Protocol Data Unit, if the receiving side determined that the received reset Protocol Data Unit is the first received reset Protocol Data Unit after re-establishment of the Radio Link Control entity or determined that the Reset Sequence Number is not the same as a Reset Sequence Number included in a last received reset Protocol Data Unit.

Additionally, the present disclosure provides a reset method for a receiving side protocol entity, the method comprising: receiving, from a transmitting side protocol entity, a reset request that includes a reset indicator; determining whether the received reset request is not the first received reset request after re-establishment of the protocol entity; determining whether the reset indicator is the same as a reset indicator included in a last received reset request; and re-transmitting, to the transmitting side protocol entity, a reset response that was last transmitted, if both conditions of the above two determining steps are satisfied. The method may further comprise: determining whether the received reset request is the first received reset request after re-establishment of the protocol entity or determining whether the reset indicator is not the same as a reset indicator included in a last received reset request; and transmitting a reset response to the transmitting side protocol entity if the condition in the above determining step is satisfied. The method wherein the protocol entity is an Acknowledged Mode Radio Link Control entity. The method, wherein the reset request is a Reset Protocol Data Unit. The method wherein the reset indicator is a Reset Sequence Number. The method wherein the reset response is a Reset Acknowledgement Protocol Data Unit.

Furthermore, the present disclosure provides a reset method for a transmitting side protocol entity, the method comprising: transmitting, to a receiving side protocol entity, a reset request that includes a reset indicator; and receiving, from the receiving side protocol entity, a re-transmission of a reset response that was last transmitted, if the receiving side protocol entity determined that the received reset request is not the first received reset request after re-establishment of the protocol entity, and determined that the reset indicator is the same as a reset indicator included in a last received reset request. The method may further comprise: receiving a reset response from the receiving side protocol entity, if the receiving side protocol entity determined that the received reset request is the first received reset request after re-establishment of the protocol entity, or determined that the reset indicator is not the same as a reset indicator included in a last received reset request. The method wherein the protocol entity is an Acknowledged Mode Radio Link Control entity. The method wherein the reset request is a Reset Protocol Data Unit. The method wherein the reset indicator is a Reset Sequence Number. The method wherein the reset response is a Reset Acknowledgement Protocol Data Unit.

It should be noted that the features of the present invention are related to issues regarding the enhancement and evolution of the 3GPP standard. As such, the 3GPP TS 25.322 and its related sections or portions thereof, as well as various developing enhancements thereof pertain to the present invention. It can be clearly understood that the labeling and terminology used to describe the present invention are merely exemplary and thus may be altered (or later clarified) as a result of ongoing or future discussions.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A reset method for a receiving side Acknowledged Mode Radio Link Control entity, the method comprising:
   receiving, from a transmitting side, a reset Protocol Data Unit that includes a Reset Sequence Number; and
   if the received reset Protocol Data Unit is not the first received reset Protocol Data Unit after re-establishment of the Radio Link Control entity and if the Reset Sequence Number is the same as a Reset Sequence Number included in a last received reset Protocol Data Unit, re-transmitting a reset Acknowledgement Protocol Data Unit that was last transmitted to the transmitting side.

2. The method of claim 1, further comprising:
   if the received reset Protocol Data Unit is the first received reset Protocol Data Unit after re-establishment of the Radio Link Control entity or if the Reset Sequence Number is not the same as a Reset Sequence Number included in a last received reset Protocol Data Unit, transmitting a reset Acknowledgement Protocol Data Unit to the transmitting side.

3. A reset method for a transmitting side Acknowledged Mode Radio Link Control entity, the method comprising:
   transmitting, to a receiving side, a reset Protocol Data Unit that includes a Reset Sequence Number; and
   receiving, from the receiving side, a re-transmission of a reset Acknowledgement Protocol Data Unit that was last transmitted, if the receiving side determined that the received reset Protocol Data Unit is not the first received reset Protocol Data Unit after re-establishment of the Radio Link Control entity and determined that the Reset Sequence Number is the same as a Reset Sequence Number included in a last received reset Protocol Data Unit.

4. The method of claim 3, further comprising:
   receiving, from the receiving side, a reset Acknowledgement Protocol Data Unit, if the receiving side determined that the received reset Protocol Data Unit is the first received reset Protocol Data Unit after re-establishment of the Radio Link Control entity or determined that the Reset Sequence Number is not the same as a Reset Sequence Number included in a last received reset Protocol Data Unit.

5. A reset method for a receiving side Acknowledged Mode Radio Link Control entity, the method comprising:
   receiving, from a transmitting side Acknowledged Mode Radio Link Control entity, a Reset Protocol Data Unit that includes a Reset Sequence Number;
   determining whether the received Reset Protocol Data Unit is not the first received Reset Protocol Data Unit after re-establishment of the Radio Link Control entity;
   determining whether the Reset Sequence Number is the same as a Reset Sequence Number included in a last received Reset Protocol Data Unit; and
   re-transmitting, to the transmitting side Acknowledged Mode Radio Link Control entity, a Reset Acknowledgement Protocol Data Unit that was last transmitted, if both conditions of the above two determining steps are satisfied.

6. The method of claim 5, further comprising:
   determining whether the received Reset Protocol Data Unit is the first received Reset Protocol Data Unit after re-establishment of the Radio Link Control entity or determining whether the Reset Sequence Number is not the same as a Reset Sequence Number included in a last received Reset Protocol Data Unit; and transmitting a Reset Acknowledgement Protocol Data Unit to the transmitting side Acknowledged Mode Radio Link Control entity if the condition in the above determining step is satisfied.

7. A reset method for a transmitting side Acknowledged Mode Radio Link Control entity, the method comprising:

transmitting, to a receiving side Acknowledged Mode Radio Link Control entity, a Reset Protocol Data Unit that includes a Reset Sequence Number; and receiving, from the receiving side Acknowledged Mode Radio Link Control entity, a re-transmission of a Reset Acknowledgement Protocol Data Unit that was last transmitted, if the receiving side Acknowledged Mode Radio Link Control entity determined that the received Reset Protocol Data Unit is not the first received Reset Protocol Data Unit after re-establishment of the Radio Link Control entity, and determined that the Reset Sequence Number is the same as a Reset Sequence Number included in a last received Reset Protocol Data Unit.

8. The method of claim 7, further comprising:

receiving a Reset Acknowledgement Protocol Data Unit from the receiving side Acknowledged Mode Radio Link Control entity, if the receiving side Acknowledged Mode Radio Link Control entity determined that the received Reset Protocol Data Unit is the first received Reset Protocol Data Unit after re-establishment of the Radio Link Control entity, or determined that the Reset Sequence Number is not the same as a Reset Sequence Number included in a last received Reset Protocol Data Unit.

* * * * *